(12) United States Patent
Tapie et al.

(10) Patent No.: US 8,018,970 B2
(45) Date of Patent: Sep. 13, 2011

(54) UNDER SAMPLED CLOCK SIGNAL SYNCHRONIZATION AID DEVICE AND DEVICE FOR RECONSTRUCTING UNDERSAMPLED CLOCK SIGNALS, FOR A PACKET-SWITCHED NETWORK

(75) Inventors: Thierry Tapie, Rennes (FR); Serge Defrance, Rennes (FR); Bertrand Huguies, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 472 days.

(21) Appl. No.: 12/011,655

(22) Filed: Jul. 22, 2008

(65) Prior Publication Data

US 2009/0103571 A1    Apr. 23, 2009

(30) Foreign Application Priority Data

Feb. 6, 2007 (FR) ...................................... 0753084

(51) Int. Cl.
*H04J 3/06* (2006.01)
(52) U.S. Cl. ......................................................... 370/503
(58) Field of Classification Search .................. 375/345, 375/356, 362, 376; 713/400, 600; 370/503, 370/519, 518, 514, 506, 520, 510, 513
See application file for complete search history.

(56) References Cited

U.S. PATENT DOCUMENTS

| | | | | |
|---|---|---|---|---|
| 5,111,454 A | * | 5/1992 | Hung et al. | 370/337 |
| 7,020,791 B1 | * | 3/2006 | Aweya et al. | 713/400 |
| 7,236,552 B2 | * | 6/2007 | Robertson et al. | 375/354 |

FOREIGN PATENT DOCUMENTS

| | | |
|---|---|---|
| DE | 4405297 | 8/1995 |
| EP | 0624983 | 11/1994 |
| EP | 0768769 | 4/1997 |

OTHER PUBLICATIONS

Anonymous: "Variable-length code: Instantaneous codes" Wikipedia, The Free Encyclopedia [Online] XP002452297 Extrait de l'Internet: URL:http://en.wikipedia.org/wiki/Variable-length_code#Instantaneous codes> {extrait le Sep. 25, 2007} *le document en entire*.
Lau R C et al: "Synchronous Techniques For Timing Recovery in BISDN" IEEE Transactions on Communications, IEEE Service Center, Piscataway, NJ, US, vol. 43, No. 2/4, Part 3, 1 fevrier 1995 (Feb. 1, 1995), pp. 1810-1818) XP000505653 ISSN: 0090-6778 *p. 1812, colonne 1-colonne 2*.

* cited by examiner

*Primary Examiner* — Chi H Pham
*Assistant Examiner* — Alexander Boakye
(74) *Attorney, Agent, or Firm* — Robert D. Shedd; Harvey D. Fried; James McKenzie

(57) ABSTRACT

A synchronization aid device is part of receiving communication equipment of an IP network, having a primary clock signal consisting of primary clock pulses spaced apart by a first period. This device comprises i) a required to increment its value by one unit on each primary clock pulse and reset its value to zero each time it reaches a value M, ii) detection means required to generate a secondary clock pulse each time the value of the counter is zero, the secondary clock pulses forming a secondary clock signal having a second period equal to M times the first period, and iii) control means required, each time the receiving equipment receives a packet containing at least one first bit having a first value, to initialize the counter with a chosen value.

13 Claims, 4 Drawing Sheets

UNDER SAMPLED CLOCK SIGNAL SYNCHRONIZATION AID DEVICE AND DEVICE FOR RECONSTRUCTING UNDERSAMPLED CLOCK SIGNALS, FOR A PACKET-SWITCHED NETWORK

This application claims the benefit, under 35 U.S.C. §119 of European Patent Application 0753084, filed Feb. 6, 2007.

TECHNICAL FIELD OF THE INVENTION

The invention relates to packet-switched communication networks, and more specifically the synchronization of undersampled clock signals used by communication equipment connected to such networks.

The invention relates to all the packet-switched communication networks, and in particular those with IP (internet protocol) packet switching, whether wired (for example Ethernet (IEEE 802.3)) or wireless (for example IEEE 802.16 D-2004).

The term "communication equipment" should be understood here to mean any type of communication equipment that forms part of, or can be connected to, a (communication) network and requires a secondary clock signal, the frequency of which is divided compared to that of a primary clock signal, the rate of which is fixed by a remote transmitter, and which is synchronized (in phase) relative to one and the same secondary clock signal used by at least one other item of communication equipment. It can therefore be, for example, equipment used to display video images filmed by a camera and having to be synchronized with each other (including with the camera), and in particular fixed or mobile telephones, fixed or portable computers, personal digital assistants (PDAs), video recorders and cameras.

STATE OF THE ART

As those skilled in the art know, in some networks of the abovementioned type, communication equipment receives from a remote transmitter "sampling pulses" which define a primary clock signal having a first period. A sampling pulse defines a sampling instant. It can also, when it constitutes a frame pulse, as in the case of the IEEE 802.16-D standard, define for each item of equipment (or station) the moment when it can send or receive a frame. This type of sampling pulse is, for example (and in a non-limiting way), defined by the IEEE 1588 standard initially dedicated to Ethernet networks (wired) and recently extended to wireless networks (of all types). It is used with a clock synchronization protocol called PTP (Precision Time Protocol). It will be noted that the invention applies regardless of the type of sampling pulse used, and therefore regardless of the type of primary clock signal used, provided that the rate of the latter is fixed by a remote transmitter.

As indicated previously, some communication equipment (of the abovementioned type) needs to perform certain internal processing operations (like, for example, a filtering or a servo-control operation) with a sampling period that is greater than that of the primary clock signal that the equipment uses elsewhere. As a non-limiting example, it is generally accepted that, in the case of a digital servo-control, the rise time of the system to be servo-controlled corresponds to 15 to 20 primary sampling periods of 5 ms, for example. It will then be understood that, by increasing the sampling period (therefore by reducing the sampling rate), the number of operations to be performed is reduced.

SUMMARY OF THE INVENTION

Techniques have been proposed for generating in remote equipment a secondary clock signal of which the period is a multiple of that of a synchronous primary clock signal on said equipment. However, none of the known techniques makes it possible to guarantee that the secondary clock signals produced from the primary clock signals will be synchronous in such equipment. In practice, while it is easy to eliminate m (primary sampling) pulses out of n (with m<n) in remote equipment, it is difficult to make these eliminations of clock pulses synchronous and therefore make it possible to obtain secondary clock signals in phase. In practice, it is observed that there is almost always a phase difference between the secondary clock signals generated in the equipment, and that the phase difference is not constant from one power up to another.

The aim of the invention is therefore to make it possible to divide the frequency of a primary clock signal that is present and in phase in remote equipment connected to a packet-switched network (of IP type for example) and retain the phase from one power up to the next.

To this end, the invention first of all proposes a synchronization aid device, for transmitting communication equipment, on the one hand, connected to a packet-switched communication network specifically for transmitting packet frames, and on the other hand, having a primary clock signal consisting of primary clock pulses spaced apart by a first period.

This synchronization aid device is characterized by the fact that it comprises:

a counter required to increment its value by one unit on each primary clock pulse and reset its value to zero every M primary clock pulses, and control means required to generate on each primary clock pulse at least one first bit, on the one hand, having a first or a second value depending on whether the value of the counter is zero or non-zero, and on the other hand, intended to be incorporated in a packet in order to be transmitted by the transmitting equipment.

The synchronization aid device according to the invention can include other characteristics which can be taken separately or in combination, and in particular:

its control means can be required to generate on each primary clock pulse, in association with the first bit, a set of at least one second bit representing the value of M, each first bit and the associated set being generated so as to be incorporated in one and the same packet in order to be transmitted simultaneously by the transmitting equipment;

its control means can be required to generate a secondary clock pulse in addition to at least one first bit having a first value, the secondary clock pulses forming a secondary clock signal having a second period equal to M times the first period;

the first and second values of the first bit can be either respectively equal to one and zero, or respectively equal to zero and one.

The invention also proposes transmitting communication equipment, for a packet-switched communication network specifically for transmitting packet frames, and equipped with a synchronization aid device of the type of that described hereinabove.

The invention also proposes a device, dedicated to the reconstruction of clock signals, for receiving communication equipment, on the one hand, connected to a packet-switched communication network specifically for transmitting packet frames, and on the other hand, having a primary clock signal consisting of primary clock pulses spaced apart by a first period.

This device for reconstructing clock signals is characterized by the fact that it comprises:

- a counter required to increment its value by one unit on each primary clock pulse and reset its value to zero each time it reaches a value M,
- detection means required to generate a secondary clock pulse each time the value of the counter is zero, the secondary clock pulses forming a secondary clock signal having a second period equal to M times the first period, and
- control means required, each time the receiving equipment receives a packet containing at least one first bit having a first value, to initialize the counter with a chosen value.

The device for reconstructing clock signals according to the invention can include other characteristics which can be taken separately or in combination, and in particular:

- the initialization value is chosen to be equal to zero or one;
- the value M can be predefined;
- as a variant, the control means can be required, each time the receiving equipment receives a packet containing a set of at least one second bit representing the value of M and associated with a first bit having a first value, to provide the counter with the value of M in order for it to use it for its resets.

The invention also proposes receiving communication equipment, for a packet-switched communication network specifically for transmitting packet frames, and equipped with a device for reconstructing clock signals of the type of that described hereinabove.

BRIEF DESCRIPTION OF THE DRAWINGS

Other characteristics and advantages of the invention will become apparent from studying the detailed description below, and the appended drawings, in which.

The appended drawings can not only serve to complement the invention, but also contribute to its definition, as appropriate.

DETAILED DESCRIPTION

The object of the invention is to allow for the division of the frequency of a primary clock signal present and in phase in remote equipment connected to a packet-switched communication network and retain the phase from one power up to the next.

Hereinafter, it will be assumed by way of non-limiting example that the packet-switched communication network is a wired local area network (for example of Ethernet type (802.3)) offering IP access. However, the invention is not limited to this type of network. It relates in practice to any type of packet-switched communication network capable of transmitting packet frames (possibly of IP type) by wired or wireless means.

Moreover, it is assumed hereinafter, by way of non-limiting example, that the mechanism for periodic transmission of (primary) clock pulses is that which is defined by the IEEE 1588 standard (initially dedicated to Ethernet networks (wired) and recently extended to wireless networks (of all types)) and which is used with the clock synchronization protocol called PTP (Precision Time Protocol). Consequently, the (primary) clock pulses are sampling pulses of which the (sampling) period is equal to 5 ms, for example. However, the invention is not limited to this type of clock pulse. It applies in practice regardless of the type of (primary) clock pulse used. It will be noted that the (primary) clock pulses are transmitted to the communication equipment (or stations) by wired or wireless means. Consequently, they are not necessarily transmitted by the packet-switched network to which the equipment is connected.

The equipment affected by the invention includes, for example (but in a non-limiting way), equipment that can be used to view video images filmed by a camera and having to be synchronized with each other (including with the camera), and in particular fixed or mobile telephones, fixed or portable computers, personal digital assistants (PDAs), video recorders and cameras, and all equipment needing a sampling period less than that commonly available on all the latter. As a general rule, the invention relates to all communication equipment that is connected to a packet-switched network and that needs a secondary clock signal, the frequency of which is divided relative to that of a primary clock signal of which the rate is fixed by a remote transmitter, and which is synchronized (in phase) relative to one and the same secondary clock signal used by at least one other item of communication equipment.

Figure 1:
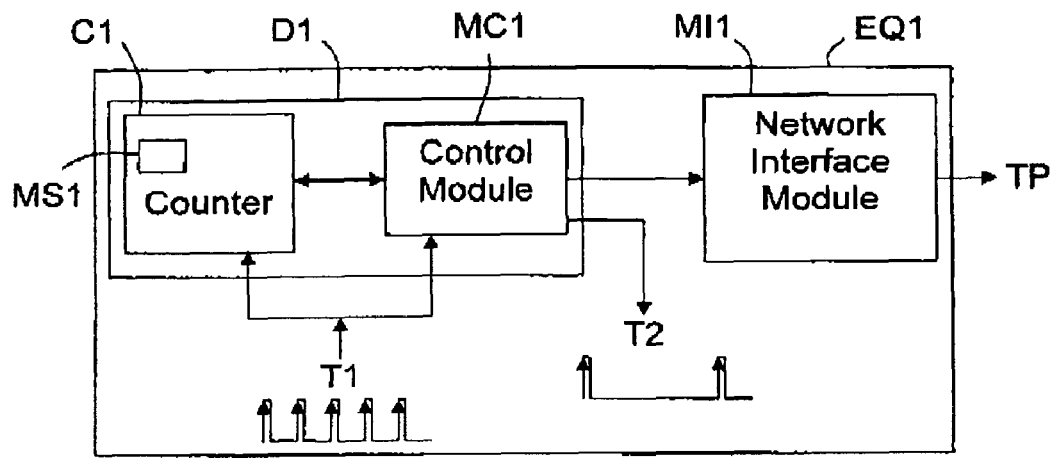
FIG. 1 very schematically and functionally illustrates exemplary transmitting communication equipment comprising an exemplary embodiment of a synchronization aid device according to the invention, FIG. 2 very schematically and functionally illustrates exemplary receiving communication equipment comprising an exemplary embodiment of a device for reconstructing clock signals according to the invention.

Reference is first of all made to FIG. 1 to describe a synchronization aid device D1 according to the invention. As illustrated, such a device D1 can be part of communication equipment EQ1 connected to a packet-switched network (of IP type in this case). However, in a variant, the device D1 can be an element (like, for example, an electronic card) external to the equipment EQ1 but coupled to the latter.

It is important to note that the device D1 forms part of, or is connected to, equipment EQ1 that is required to define a secondary (sampling) period T2 for secondary clock signals in phase (or phase shifted in a constant way) for at least one other remote item of communication equipment EQ2, also connected to the IP network and also receiving the primary clock signal synchronized and defined by the sampling pulses of primary (sampling) period T1. Hereinafter, the term "transmitting equipment" will therefore be used to denote the equipment EQ1 and "receiving equipment" to denote the equipment EQ2.

A (synchronization aid) device D1 comprises a control module MC1 and a counter C1.

The counter C1 receives from the transmitting equipment EQ1 the primary clock signal of primary period T1 and defined by primary clock pulses. It is required to increment its value $V_{C1}$ by one unit (+1) on each primary clock pulse and to reset its value $V_{C1}$ to zero every M primary clock pulses.

Consequently, its value $V_{C1}$ changes between the values 0 and M−1, since, when its value $V_{C1}$ is M−1 following an nth primary clock pulse, it is automatically reset to zero (0) following the (n+1)th ensuing primary clock pulse.

The control module MC1 also receives from the transmitting equipment EQ1 the primary clock signal of primary period T1. It is required to generate, following each primary clock pulse, at least one first bit B1 having a first or a second value $V_{B1}$ dependent on the value $V_{C1}$ that this counter C1 has following this same primary clock pulse. More specifically, if, following a primary clock pulse, the control module MC1 detects that $V_{C1}$ is equal to zero (0), then it generates a first bit B1 having a first value $V_{B1}$, for example equal to one (1) and, if, following a primary clock pulse, the control module MC1 detects that $V_{C1}$ is within the range of values [1, M−1], then it generates a first bit B1 having a second value $V_{B1}$, for example equal to zero (0).

It will be noted that the reverse situation can be envisaged, namely first and second values $V_{B1}$ respectively equal to zero (0) and one (1).

Each first bit B1, generated in this way following each primary clock pulse, is intended to be incorporated in a packet PE in order to be transmitted immediately by the transmitting equipment EQ1 before the next primary clock pulse. Each packet PE comprising the first bit B1 is, for example, generated by a network interface module MI1 of the transmitting equipment EQ1. It will be noted that each packet is incorporated in a frame TP which is transmitted via the IP network to at least one item of receiving equipment EQ2.

Preferably, each time the first bit B1 has a value $V_{B1}$ equal to the first value (for example $V_{B1}$=1), the control module MC1 also generates a secondary clock pulse. The secondary clock pulses generated in this way form a secondary clock signal which has a second period T2 equal to M times the first period T1. M then defines a modulo value. The device D1 thus locally generates a secondary clock signal of which the period T2 is a multiple of that T1 of the primary clock signal.

The value M can take any integer value greater than or equal to two (M≥2). For example, M is equal to 4. It will be noted that this value M can be constant in time. In this case, it is not necessary to transmit it to each item of receiving equipment EQ2, since it is assumed to know it.

However, the value M can also be variable according to needs. In this case, it must be transmitted to each item of receiving equipment EQ2. To this end, the control module MC1 also generates a set of second bit(s) which represents the value of M following each primary clock pulse and in association with the first bit B1. The number of second bits of a set that is generated depends on the maximum value that M can take. For example, to signal a value of M between two (2) and five (5) two second bits are sufficient. To signal a value of M between two (2) and nine (9) three second bits are needed.

For example, as illustrated in FIG. 1, the counter C1 comprises a memory MS1 in which it stores the value of M that it must use to perform its resets. This value of M is, for example, supplied to it by the control module MC1.

When the control module MC1 generates a first bit B1 and a set of associated second bit(s), they are incorporated in one and the same packet PE, for example by the network interface module MI1, which is itself incorporated in a frame TP which is transmitted via the IP network to at least one item of receiving equipment EQ2.

Figure 3:
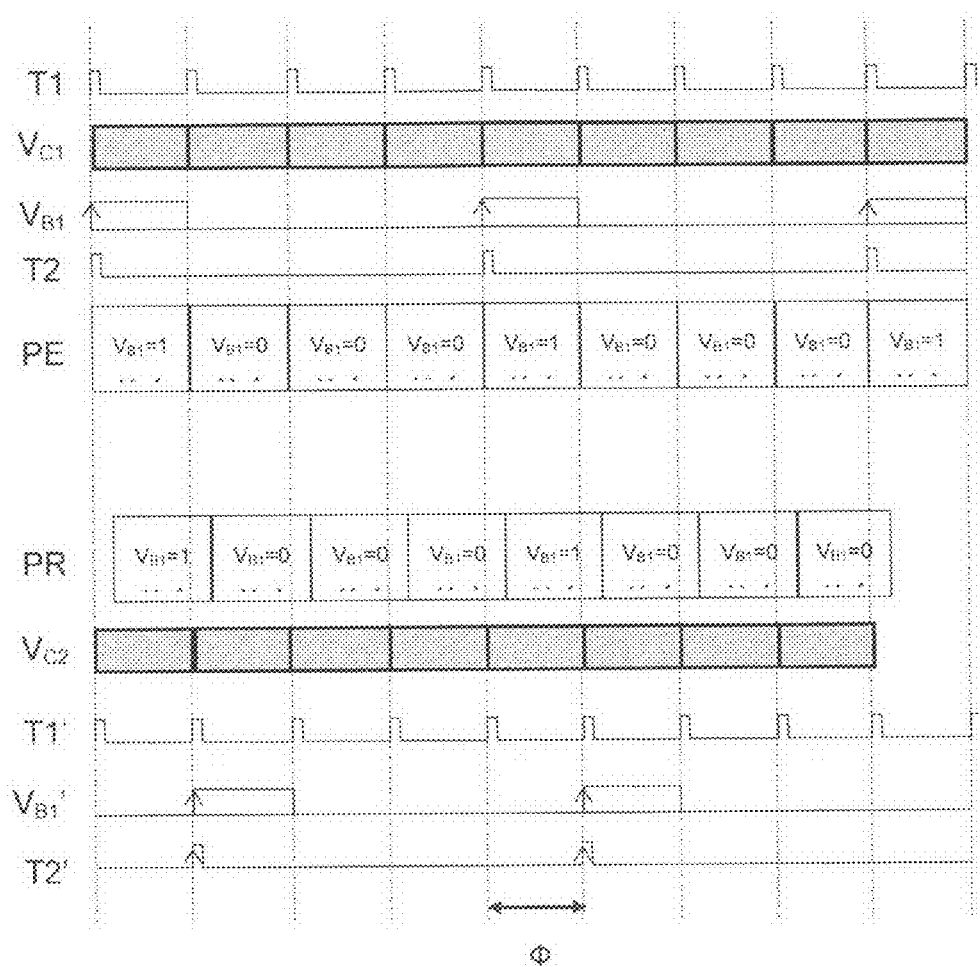
FIG. 3 illustrates examples of time trend diagrams of the primary clock signal (T1) in transmission, of the value of the counter C1 ($V_{C1}$) in transmission, of the value ($V_{B1}$) of the first bit generated in transmission, of the secondary clock signal (T2) in transmission, of the content of the packet to be transmitted (PE) in transmission, of the content of the received packet (PR) in reception, of the value of the counter (C2) ($V_{C2}$) in reception, of the primary clock signal (T1') in reception, of the value ($V_{B1}$') of the first bit received in reception, and of the secondary clock signal (T2') in reception, in the presence of a constant phase difference.
Figure 4:
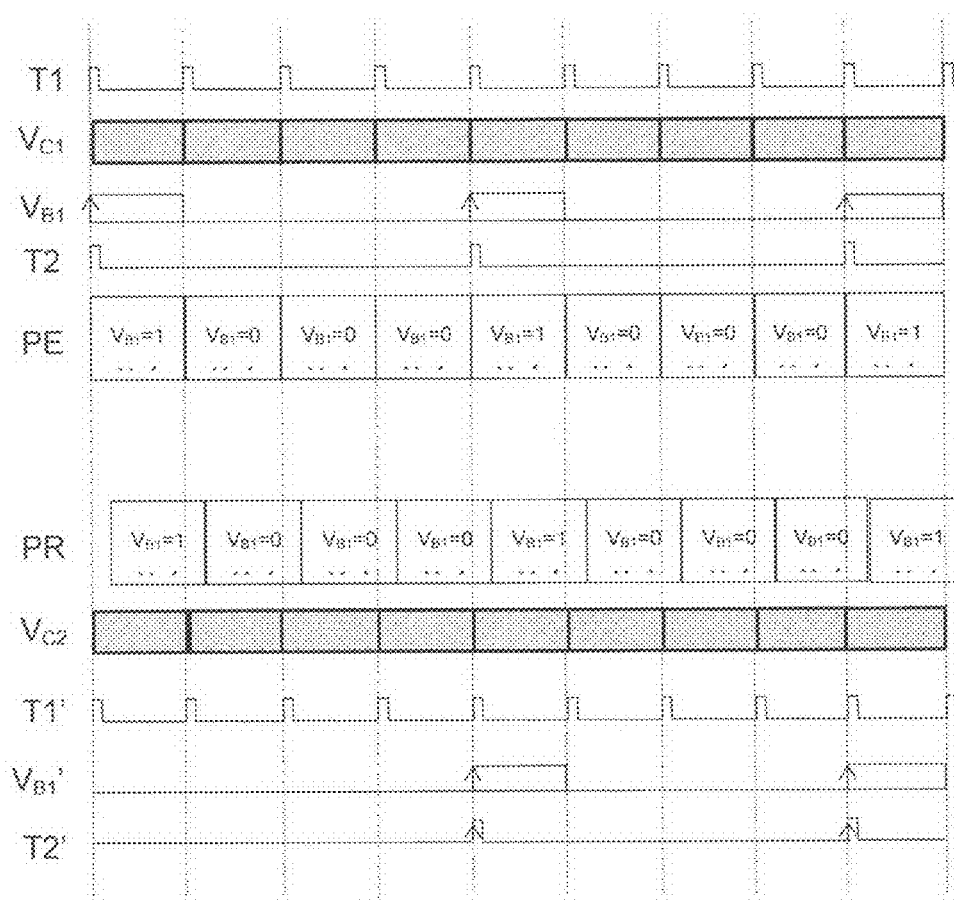
FIG. 4 illustrates the same examples of time trend diagrams as those of FIG. 3, but in the absence of any phase difference.
Figure 5:
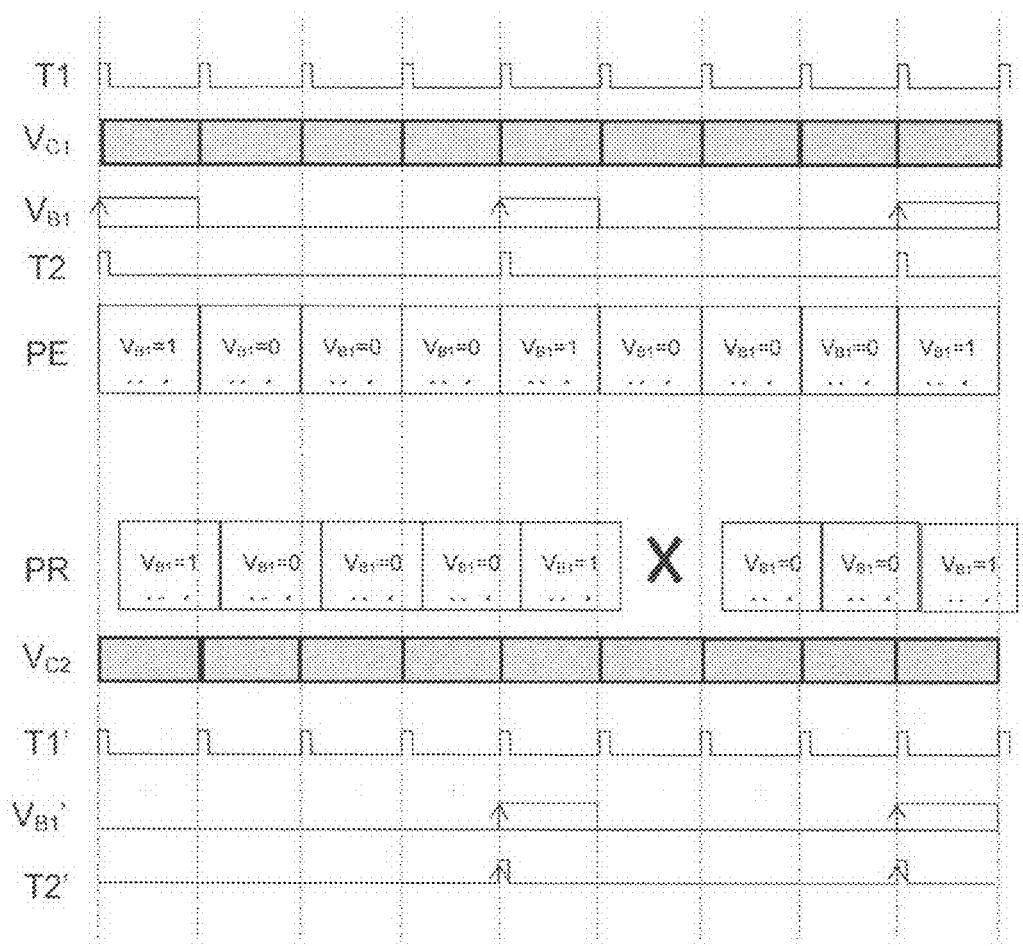
FIG. 5 illustrates the same examples of time trend diagrams as those of FIG. 4, but when one of the packets is not received.

The first five timing diagrams illustrated in FIGS. 3 to 5 are non-limiting examples (on the transmission side) of the time trends of a primary clock signal T1, of the value $V_{C1}$ of the counter C1 when M is equal to four (4), of the value $V_{B1}$ of the first bit B1 generated by the device D1, of the secondary clock signal T2 generated locally by the device D1, and of the content (B1, M) of the packet PE to be transmitted when the device D1 generates a first bit B1 and a set of second bit(s) representing M.

The counter C1 is preferably implemented in the form of electronic circuits ("hardware"). However, it is possible to envisage it being implemented in the form of a combination of software modules ("software") and electronic circuits ("hardware").

The control module MC1 is preferably implemented in the form of software modules. However, it is possible to envisage it being implemented in the form of a combination of software modules and electronic circuits.

Figure 2:
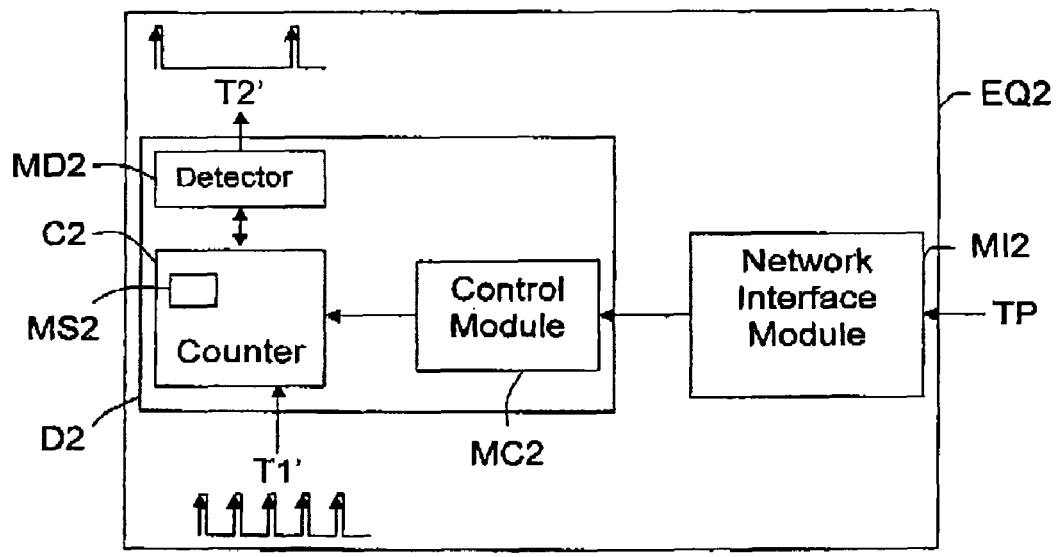

Reference is now made to FIG. 2 to describe a device for reconstructing clock signals D2 according to the invention. As illustrated in FIG. 2, such a device D2 can be implemented in receiving equipment EQ2 needing a secondary clock signal in phase with (or phase shifted by a constant value relative to) that generated by the device D1 of transmitting equipment EQ1. It will be noted that, in a variant, the device (for reconstructing clock signals) D2 can be an element (like, for example, an electronic card) external to the receiving equipment EQ2 but coupled to the latter.

A device (for reconstructing clock signals) D2 comprises a control module MC2, a detection module MD2 and a counter C2.

The counter C2 receives from the receiving equipment EQ2 the primary clock signal of primary period T1' and defined by primary clock pulses. It is required to increment its value $V_{C2}$ by one unit (+1) on each primary clock pulse and to reset its value $V_{C2}$ to zero every M primary clock pulses. The primary periods T1 and T1' are identical.

Consequently, its value $V_{C2}$ changes between the values 0 and M−1, since, when its value $V_{C2}$ is M−1 following an nth primary clock pulse, it is automatically reset to zero (0) following the (n+1)th ensuing primary clock pulse.

The detection module MD2 is required to observe the current value $V_{C2}$ of the counter C2, in order to generate a secondary clock pulse each time this value $V_{C2}$ is zero (following the last primary clock pulse). The secondary clock pulses generated in this way form a secondary clock signal which has a second period T2' equal to M times the first period T1'. The secondary periods T2 and T2' are identical. M also defines a modulo value. The device D2 thus locally generates a secondary clock signal of which the period T2' is a multiple of that T1' of the primary clock signal.

The phasing of the secondary clock signals generated respectively by the devices D1 and D2 is handled by the control module MC2.

More specifically, the control module MC2 is required, each time the receiving equipment EQ2 receives a packet PR containing at least one first bit B1 having a first value $V_{B1}'$, to initialize the value $V_{C2}$ of the counter C2 with a chosen value. $V_{B1}$ and $V_{B1}'$ are equal.

To this end, the control module MC2 is, for example, arranged to analyse the content of the packets PR that are received in frames originating from the IP network by a network interface module MI2 of the receiving equipment EQ2.

The initialization value of the counter C2 can, for example, be equal to zero (0). In this case, each time a received packet PR comprises a first bit B1 having a first value $V_{B1}'$ (for example equal to one (1)), the control module MC2 forces the counter C2 to take the value zero (0), regardless of its current value $V_{C2}$. When the detection module MD2 detects that the value $V_{C2}$ of the counter C2 has become zero (0), it immediately generates a secondary clock pulse.

The first five timing diagrams illustrated in FIG. 3 are non-limiting examples (on the receiving side) of the time trends of the content (B1, M) of the received packet PR when the device D1 has generated a first bit B1 and a set of second bit(s) representing M, of the value $V_{C2}$ of the counter C2 when M is equal to four (4), of a primary clock signal T1', of the value $V_{B1}'$ Of the first bit B1 contained in the received packets PR, and of the secondary clock signal T2' generated locally by the device D2.

As can be seen by comparing the fifth (PE) and sixth (PR) timing diagrams of FIG. 3, because a packet PR arrives in the receiving equipment EQ2 straddling two primary (sampling) periods T1', its content can be entirely known by the control module MC2 only with an offset (F) of at least one primary period relative to the primary period during which it was transmitted by the transmitting equipment EQ1. The result of this, can be seen by comparing the fourth (T2) and tenth (T2') timing diagrams of FIG. 3, is that the secondary clock pulses (T2'), which are generated by the device D2, are systematically phase shifted by a constant value, equal to at least one primary period (T1'), relative to the secondary clock pulses (T2) which are generated by the device D1. This offset (F) can be accentuated if the transmission duration of the packets is greater than the duration of the primary period T1 (but there is still a constant final phase shift (or offset F)).

In order to eliminate this phase shift (or time offset F) which is systematical and constant, the control module MC2 can initialize the counter C2 with an initialization value equal to one (1). In this case, each time a received packet PR comprises a first bit B1 having a first value $V_{B1}'$ (for example equal to one (1)), the control module MC2 forces the counter C2 to take the value one (1), regardless of its current value $V_{C2}$. The counter C2 is then incremented normally from this value 1 on each subsequent primary clock pulse. It will be noted that the detection module MD2 proceeds to generate a new secondary clock pulse only when it detects that the value $V_{C2}$ of the counter C2 has become zero (0), or M−1 primary clock pulses later. This situation is illustrated by the timing diagrams of FIG. 4.

As can be seen by comparing the fourth (T2) and tenth (T2') timing diagrams of FIG. 4, thanks to the initialization of the counter C2 with the value one (1), the secondary clock pulses (T2'), which are generated by the device D2, are perfectly in phase with the secondary clock pulses (T2) which are generated by the device D1.

When a packet PE is lost in the IP network on its transfer between the transmitting EQ1 and receiving EQ2 equipment, this does not disturb the mechanism for generation of secondary clock pulses (T2') by the device D2. In practice, if the lost packet PE comprises a first bit B1 having the second value $V_{B1}$, for example equal to zero (0), its loss is inconsequential since it is not taken into account by the control module MC2 for its initializations of the counter C2. Now, if the lost packet PE comprises a first bit B1 having the first value $V_{B1}$, for example equal to one (1), its loss is also inconsequential since the counter C2 continues to be incremented normally since its last initialization (with the value 0 or 1) by the control module MC2, and therefore the detection module MD2 will generate a secondary clock pulse immediately it detects that the value $V_{C2}$ of the counter C2 has become zero (0). This situation is illustrated by the timing diagrams of FIG. 5.

It will be noted that the invention can make it possible to control the offset (or phase shift) F so that it is equal to zero (0). However, it can also make it possible to control the offset (or phase shift) F such that it is equal to a chosen value, an integer multiple of the primary period T1. To do this, the initialization value of the counter C2 is chosen according to the time offset value F that is to be introduced between the transmitting equipment EQ1 and the receiving equipment EQ2.

A situation has been described hereinabove in which the value M is constant in time and therefore known to the device D2. As indicated previously, when this value M can vary in time the device D2 is informed of this by the set of second bit(s) which represents the value M and which is associated with a first bit B1 in a received packet PR.

In this case, when a received packet PR includes a first bit B1 having the first value $V_{B1}'$, it determines the value M which is represented by the set of second bit(s) associated with this first bit B1 and communicates it to the counter C2 in order for it to use it immediately (immediately after the next primary clock pulse). For example, and as illustrated in FIG. 2, the counter C2 comprises a memory MS2 in which it stores the value of M which is supplied to it by the control module MC2 and which it must use to perform its resets.

It will be noted that the device D1 can at any moment change the value of M, when it receives the command to do so, in order to modify the secondary clock period used hitherto both locally and in the receiving equipment EQ2. This modification is then taken into account by the device D2 immediately it detects a packet PR containing a first bit B1 having the first value $V_{B1}'$ and a set of second bit(s) representing a new value M.

The counter C2 is preferably implemented in the form of electronic circuits ("hardware"). However, it is possible to envisage it being implemented in the form of a combination of software modules ("software") and electronic circuits ("hardware").

The control module MC2 and the detection module MD2 are preferably implemented in the form of software modules. However, it is possible to envisage at least one of them being implemented in the form of a combination of software modules and electronic circuits.

The invention is not limited to the embodiments of synchronization aid device, of device for reconstructing clock signals, of communication equipment which have been described hereinabove purely by way of example; it encompasses all the variants that can be envisaged by those skilled in the art within the context of the claims hereinafter.

The invention claimed is:

1. Synchronization aid device for transmitting communication equipment connected to a packet-switched communication network specifically for transmitting packet frames, and having a primary clock signal consisting of primary clock pulses spaced apart by a first period, said device comprising
   i) a counter arranged to increment its value by one unit on each primary clock pulse and to reset its value to zero every M primary clock pulses, and
   ii) control means arranged to generate on each primary clock pulse at least one first bit, on the one hand, having a first or a second value depending on whether the value of said counter is zero or non-zero, and on the other hand intended to be incorporated in a packet in order to be transmitted by said transmitting equipment, characterized in that
   said control means are arranged to generate on each primary clock pulse, in association with said first bit, a set of second bit(s) representing the value of M, each first bit and the associated set being generated so as to be incorporated in one and the same packet in order to be transmitted simultaneously by said transmitting equipment.

2. Device according to claim 1, wherein said control means are arranged to generate a secondary clock pulse in addition to at least one first bit having a first value, said secondary clock pulses forming a secondary dock signal having a second period equal to M times the first period.

3. Device according to claim 1, wherein said first and second values of the first bit are respectively equal to one and zero.

4. Device according to claim 2, wherein said first and second values of the first bit are respectively equal to one and zero.

5. Device according to claim 1, wherein said first and second values of the first bit are respectively equal to zero and one.

6. Device according to claim 2, wherein said first and second values of the first bit are respectively equal to zero and one.

7. Transmitting communication equipment for a packet-switched communication network specifically for transmitting packet frames, characterized in that it comprises a synchronization aid device according to claim 1.

8. Device for reconstructing clock signals for receiving communication equipment connected to a packet-switched communication network specifically for transmitting packet frames, and having a primary clock signal consisting of primary clock pulses spaced apart by a first period, characterized in that it comprises i) a counter arranged to increment its value by one unit on each primary clock pulse and to reset its value to zero each time it reaches a value M, ii) detection means arranged to generate a secondary clock pulse each time said value of the counter is zero, said secondary clock pulses forming a secondary clock signal having a second period equal to M times the first period, and iii) control means arranged, each time said receiving equipment receives a packet containing at least one first bit having a first value, to initialize said counter with a chosen value.

9. Device according to claim 8, wherein said initialization value is chosen to be equal to zero.

10. Device according to claim 8, wherein said initialization value is chosen to be equal to one.

11. Device according to claim 8, wherein said value M is predefined.

12. Device according to claim 8 wherein said control means are arranged, each time said receiving equipment receives a packet containing a set of second bit(s) representing the value of M and associated with a first bit having a first value, to provide said counter with said value of M in order for it to use it for its resets.

13. Receiving communication equipment for a packet-switched communication network, specifically for transmitting packet frames, wherein it comprises a device for reconstructing clock signals according to claim 8.

* * * * *